United States Patent [19]

Tessier

[11] Patent Number: 5,762,774
[45] Date of Patent: Jun. 9, 1998

[54] APPARATUS FOR THE PURIFICATION OF LIQUIDS AND A METHOD OF MANUFACTURING AND OF OPERATING SAME

[75] Inventor: David F. Tessier, Oakville, Canada

[73] Assignee: Glegg Water Conditioning, Inc., Guelph, Canada

[21] Appl. No.: 781,959

[22] Filed: Dec. 20, 1996

[51] Int. Cl.$^6$ ............................................. B01D 61/48
[52] U.S. Cl. .................... 204/524; 204/529; 204/533; 204/536; 204/632; 204/647
[58] Field of Search ................... 204/524, 529, 204/533, 536, 632, 647

[56] References Cited

U.S. PATENT DOCUMENTS

| | | | |
|---|---|---|---|
| 4,956,071 | 9/1990 | Giuffrida et al. | 204/524 |
| 5,066,375 | 11/1991 | Parsi et al. | 204/524 |
| 5,292,422 | 3/1994 | Liang et al. | 204/632 |

Primary Examiner—Arun S. Phasge
Attorney, Agent, or Firm—Renner, Otto, Boisselle & Sklar

[57] ABSTRACT

A method of manufacturing an apparatus for the electrodeionization of a fluid includes determining the flow rate of the fluid to be deionized, its initial concentration of ionic impurities, a desired post-processing concentration of ionic impurities and appropriately selecting the number of diluting compartments for use in the apparatus and the electrical current to be applied between the anode and cathode in the apparatus and manufacturing the apparatus accordingly. A method of operating an apparatus for electrodeionization of a fluid includes monitoring the concentration of ionic impurities of the fluid to be deionized, monitoring the concentration of ionic impurities of the fluid which has been processed by the apparatus, determining the flow rate of the fluid to be deionized and altering the electrical current applied between the anode and cathode to maintain a predefined relationship between the drop in the concentration of ionic impurities of the fluid through the apparatus and the electrical current and the flow rate within a selected range of values. A novel electrodeionization apparatus includes an electrodeionization core, means for determining the concentration of the ionic impurities of fluid to be processed within the apparatus, a means for determining the concentration of the ionic impurities conductivity of fluid which has been processed within the apparatus, a measuring device to determine the flow rate of fluid processed by the apparatus, a current sensing device to measure the electrical current applied to the anode and cathode and a control device to process these values and to alter the electrical current applied to the anode and cathode of the apparatus to maintain a predefined ratio between the measured values within a selected range of values.

19 Claims, 4 Drawing Sheets

APPARATUS FOR THE PURIFICATION OF LIQUIDS AND A METHOD OF MANUFACTURING AND OF OPERATING SAME

FIELD OF THE INVENTION

The present invention relates to an apparatus for the purification of liquids and a method of manufacturing and a method of operating same. More particularly, the present invention relates to an apparatus for the deionization of liquids, and in particular water, by electrodeionization and a method of manufacturing and a method of operating the apparatus.

BACKGROUND OF THE INVENTION

The purification of liquids is of great interest in many industries and, in particular, pure water is used for many industrial purposes such as in the production of semiconductor chips, pharmaceuticals, etc. and removing ionic impurities (deionizing) is one of the necessary stages of purifying water for such processes.

Recently, electrodeionization apparatus has become one of the preferred methods of deionizing water and other liquids. The term "electrodeionization" generally refers to an apparatus and/or methods for removing ionic impurities from liquids which employ a combination of ion exchange resins, ion exchange membranes and electrical currents to transfer ions from the liquid to be deionized to another, "waste" liquid.

Known electrodeionization (EDI) apparatus, such as those sold by the assignee of the present invention, generally comprise alternating arrangements of cation permeable membranes and anion permeable membranes defining compartments therebetween. In alternate ones of these compartments, there is provided ion exchange material and the compartments with the ion exchange material are referred to as diluting compartments, as ionic impurities in the fluid in these compartments are removed. The compartments which do not contain the ion exchange material are referred to as concentrating compartments, as the ionic impurities removed from the diluting compartments are received in the concentrating compartments.

In use, liquid to be deionized is passed through the diluting compartments and the "waste" liquid is passed through the concentrating compartments. The ions in the liquid to be deionized migrate from the diluting compartments through the ion exchange material and ion permeable membranes to the "waste" liquid in the concentrating compartments under the impetus of an electrical current which is passed through the compartments. The waste liquid which has received the ions while flowing through the concentrating compartments is discarded or partially recycled and the deionized liquid, which has given up its ions while flowing through the diluting compartments is recovered as the desired deionized liquid.

While the ionic impurities removed from the first liquid are commonly ions of mineral salts, such as NaCl, as used herein the term ionic impurities is intended to comprise both ions and ionizable species, such as dissolved $CO_2$, silica, ammonia and ionizable organic molecules.

Various arrangements of EDI apparatus are known and used. For example, U.S. Pat. No. 4,632,745 to Giuffrida et al. discloses an EDI apparatus and method. U.S. Pat. No. 5,154,809 to Oren et al. discloses a process for deionizing water using an EDI apparatus wherein the ion exchange material is a mixture of anion resin beads of substantially uniform size and cation resin beads of substantially uniform size. The contents of these two references are incorporated herein by reference.

However, problems exist with known EDI apparatus. For example, they must be manufactured with a number of diluting and concentrating compartments which is sufficient to achieve a desired degree of deionization for given liquids. To date, it has been difficult to determine the number of compartments required for a given installation and it is not uncommon to have an over specified EDI apparatus (i.e.—one with more compartments than are otherwise needed), thus unnecessarily increasing the cost of the system, or an under specified system (i.e.—one with fewer compartments than necessary to achieve a required degree of deionization of the first liquid) which can necessitate remedial redesign and/or reconstruction of the EDI apparatus or, at best, non-efficient operation of the EDI apparatus.

An additional problem exists in that it has been difficult to determine the amount of electrical current applied to the EDI apparatus which is necessary to achieve the desired degree of deionization. In addition, changes in the makeup of the liquid to be deionized and/or the waste liquid can change the amount of current required to achieve a desired level of deionization. Thus, EDI apparatus are typically operated with conservative electrical current levels (i.e.—electrical currents which are higher than are likely optimal) resulting in increased power consumption by the EDI apparatus and corresponding reduced power efficiency.

Accordingly, it is desired to manufacture EDI apparatus substantially without undue over specification and to operate EDI apparatus in a substantially power efficient manner.

SUMMARY OF THE INVENTION

It is an object of the present invention to provide a novel EDI apparatus and method of manufacturing an EDI apparatus which obviates or mitigates at least one of the disadvantages of the prior art. It is a further object of the present invention to provide a novel method of operating an EDI apparatus which monitors and controls the electrical current used in said EDI apparatus.

According to a first aspect of the invention, there is provided a method of manufacturing an EDI apparatus for the deionization of a first liquid supplied at or below a given maximum flow rate (Q), said apparatus comprising a cathode and an anode with a number of diluting compartments and concentrating compartments positioned between the cathode and the anode and arranged in an alternating manner, said apparatus including means for passing said first liquid through said diluting compartments at or below said given maximum flow rate and means for passing a second liquid through said concentrating compartments to receive ionic impurities from said first liquid when a electrical current is applied between said cathode and said anode, comprising the steps of:

determining the concentration of ionic impurities in the first liquid to be processed within said apparatus;

selecting a desired final concentration of ionic impurities for the first liquid after it has been processed within said apparatus;

selecting the number (n) of diluting compartments to be included in said apparatus, said selected number of diluting compartments being at least one;

selecting the number of concentrating compartments to be included in said apparatus, the selected number of concentrating compartments being at least one greater than said selected number of diluting compartments;

selecting an electrical current (I) to be applied between said anode and cathode, wherein the selection of said number of diluting compartments and the selected electrical current to be applied is such $E_f$ is greater than 1 in $$E_f = \frac{\frac{I}{F}}{\left(\frac{Q}{n}\right)\sum_i \Delta c_i \times z_i}$$

where F is the Faraday constant to convert coulombs to moles, $\Delta c_i$ is the difference in the concentration of impurity i in the first liquid to be processed and the selected final concentration of impurity i, $z_i$ is the charge of impurity i and $\Sigma \Delta c_i \times z_i$ is selected from the larger of the summation over the cationic impurities and the anionic impurities; and assembling said EDI apparatus with said selected number of diluting compartments.

Preferably, $E_f$ is in the range of from 1 to about 50. More preferably, $E_f$ is in the range of from about 5 to about 50. More preferably, $E_f$ is in the range from about 5 to about 20. More preferably, $E_f$ is in the range of from about 8 to about 15.

According to another aspect of the present invention, there is provided a method of operating an EDI apparatus for the deionization of a first liquid, said apparatus comprising a cathode and an anode with alternating diluting and concentrating compartments positioned between the cathode and the anode, the number (n) of diluting compartments being at least one and the number of concentrating compartments being at least one greater than the number of diluting compartments, said apparatus including means for passing said first liquid through said number of diluting compartments at or below a given maximum flow rate (Q) and means for passing a second liquid through said number of concentrating compartments to receive ionic impurities from said first liquid when a electrical current (I) is applied between said cathode and said anode, comprising the steps of:

determining the difference between the concentration of ionic impurities of said first fluid prior to processing by said apparatus and a concentration of ionic impurities for said fluid after processing;

determining the flow rate (Q) of the first fluid through said at least one diluting compartment;

supplying electrical current (I) between said anode and said cathode such that $E_f$ is at least 1 in $$E_f = \frac{\frac{I}{F}}{\left(\frac{Q}{n}\right)\sum_i \Delta c_i \times z_i}$$

where F is the Faraday constant to convert coulombs into moles, $\Delta c_i$ is the difference in the concentration of impurity i in the first liquid to be processed and the selected final concentration of impurity i, $z_i$ is the charge of impurity i and $\Sigma \Delta c_i \times z_i$ is selected from the larger of the summation over the cationic impurities and the anionic impurities.

Preferably, $E_f$ is in the range of from 1 to about 50. More preferably, $E_f$ is in the range of from about 5 to about 50. More preferably, $E_f$ is in the range from about 5 to about 20. More preferably, $E_f$ is in the range of from about 8 to about 15.

According to yet another aspect of the present invention, there is provided an apparatus for the electrodeionization of a fluid, comprising:

a cathode;

an anode;

an alternating series of at least one diluting compartment and a number of concentrating compartments at least one greater than the number of diluting compartments, each compartment defined between cation and anion permeable membranes and positioned between said cathode and said anode;

means to introduce said fluid to be deionized to said diluting compartments;

means to remove said fluid to be deionized from said diluting compartments after processing therein;

means to supply a waste fluid to said concentrating compartments and to remove said waste fluid therefrom;

electrical current supply means to supply an electrical current (I) to flow between said cathode and anode;

means to determine the difference in the concentration of ionic impurities in said fluid before deionization and after deionization within said at least one diluting compartment;

means to determine the flow rate (Q) of said fluid to be deionized through said diluting compartment;

control means responsive to each of said concentration difference and said determined flow rate to alter the supply of electrical current flowing between said anode and cathode such $E_f$ is greater than 1 in $$E_f = \frac{\frac{I}{F}}{\left(\frac{Q}{n}\right)\sum_i \Delta c_i \times z_i}$$

where F is the Faraday constant to convert coulombs into moles, $\Delta c_i$ is the difference in the concentration of impurity i in the first liquid to be processed and the selected final concentration of impurity i, $z_i$ is the charge of impurity i and $\Sigma \Delta c_i \times z_i$ is selected from the larger of the summation over the cationic impurities and the anionic impurities.

Preferably, $E_f$ is in the range of from 1 to about 50. More preferably, $E_f$ is in the range of from about 5 to about 50. More preferably, $E_f$ is in the range from about 5 to about 20. More preferably, $E_f$ is in the range of from about 8 to about 15.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

While the following discussion only specifically discusses the deionization of water, it will be apparent to those of skill in the art that the present invention is not so limited and it is contemplated that the present invention may be favorably employed for any suitable deionization process, as will occur to those of skill in the art.

Figure 1:
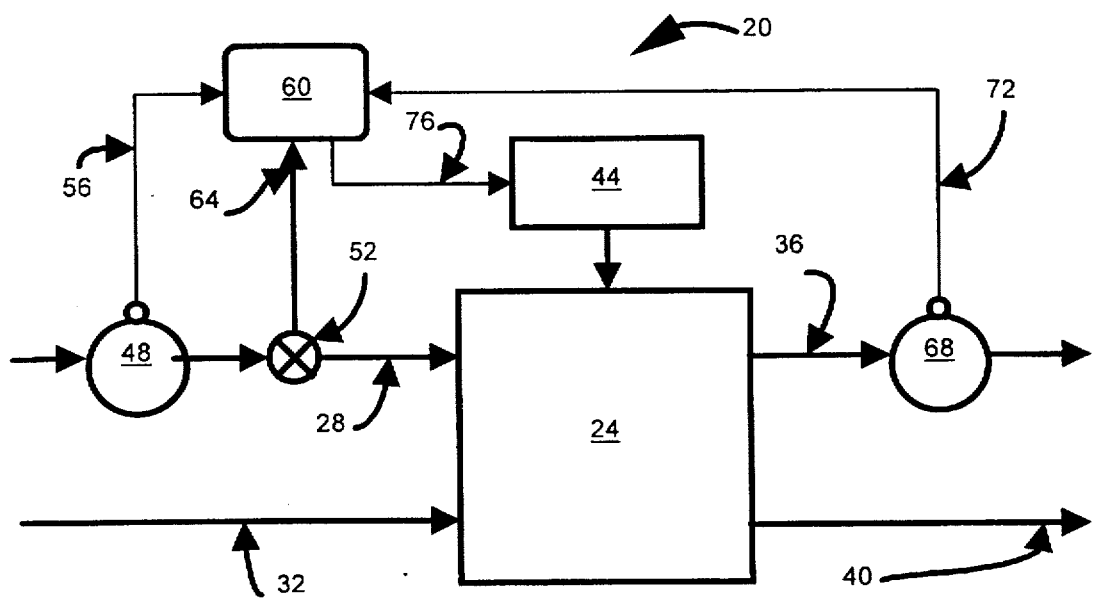
FIG. 1 shows a block diagram representation of an EDI apparatus in accordance with the present invention.

An EDI apparatus in accordance with an embodiment of the present invention is indicated generally at 20 in FIG. 1. EDI apparatus 20 includes a known EDI core 24 which comprises at least one diluting compartment and a number of concentrating compartments which is at least one greater than the number of diluting compartments. EDI core 24 will include an alternating series of diluting and concentrating compartments, with at least one concentrating compartment at each end of EDI core 24, and a manifold or other suitable means to direct a supply 28 of water to be purified to the diluting compartment or compartments in core 24 and a manifold or other suitable means to direct a supply 32 of waste water to the concentrating compartments in core 24. Apparatus 20 further includes manifolds or other suitable means to output supply 36 of deionized water and supply 40 of waste water which has received ionic impurities.

The anode and cathode in apparatus 20 are connected to a suitable source 44 of dc current such that, when a suitable current is applied between the anode and cathode, deionization of supply 28 of water occurs. As will be apparent to those of skill in the art, deionization comprises the removal of ionic impurities including ions such as mineral salts, ionizable species such as $CO_2$ and ammonia, and ionizable organic molecules.

As shown in the Figure, supply 28 of water to be deionized includes a concentration measuring means 48 which is used to determine the concentration of ionic impurities in supply 28 of water and to produce an output signal 56, to control device 60, which is a net indication of the concentration of ionic impurities in supply of water 28. For mineral salts and the like, concentration measuring means 48 can comprise a conductivity/resistivity measurement device, such as the 740 model manufactured by Thorton Associates of Waltham, Mass., USA. As will be apparent to those of skill in the art, the conductivity of water is directly proportional to the amount of ions dissolved in the water. Thus, measurements of the conductivity of water provide a reasonable indication of the amount of ions present in the water.

For ionizable organic molecules and other ionizable species, concentration measuring means 48 can comprise a Total Organic Content (TOC) analyzer, such as the Model A-2000 Widerange TOC Analyzer, manufactured by Anatel of Boulder Colo., or the like. It is contemplated that, in many circumstances, the concentration of nonmineral ions will not vary significantly and can be treated substantially as a constant. Thus, in many circumstances concentration measuring means 48 will comprise a conductivity measuring device whose output will be combined with a predetermined constant representing the concentration of non-mineral ions to produce output signal 56. If the concentration of the non-mineral ions cannot be treated as a constant, then concentration measuring means 48 will comprise both a conductivity measuring device and a TOC analyzer or the like to produce output signal 56.

Apparatus 20 further includes a flow rate measuring device 52, such as a vortex flow meter device such as the model V2-M1-A300F3000-E3, manufactured by Universal Flow Monitors, Inc. of Hazel Park, Mich., which provides an output signal 64 to control device 60. It is contemplated that in some circumstances, supply 28 of water may be provided at a constant, known, flow rate and in these circumstances flow rate measuring device 52 may merely constitute a constant, predefined, input 64 to control device 60.

Control device 60 can comprise a microcontroller, such as an Allen Bradley PLC, or any other suitable processing device as will be apparent to those of skill in the art.

Another concentration measuring means 68 determines the concentration of ionic impurities in supply 36 of deionized water output from apparatus 20 and provides an appropriate output signal 72 to control device 60. Again, concentration measuring means 68 can comprise a conductivity/resistivity measuring device and/or a TOC analyzer. It is contemplated that in many circumstances it will be acceptable to assume a constant value (for example zero) for the concentration of ionizable species in deionized water supply 36 and in these cases, concentration measuring means 68 will comprise a conductivity/resistivity measuring device whose output is combined with the assumed constant value to obtain output 72. It is also contemplated that, in other circumstances, it will be acceptable to assume the concentration of both ions and ionizable species as constants and thus concentration measuring means 68 will merely comprise a constant value input 72 to control device 60.

As will be described below in more detail, control means 60 examines signals 56, 64 and 72, whether these signals are predefined constants, measured values or a mixture of both, and provides a control signal 76 to current supply 44 to alter the current applied between the anode and cathode of core 24 to achieve a prespecified level of deionization of supply 36. In addition, and as is also described below in more detail, control means 60 can output a signal representing the present operating conditions of apparatus 20, according to a predefined E-Factor.

Depending upon the design and construction of current supply 44, output signal 76 may be sufficient to appropriately alter the current supplied to the anode and cathode in core 24 but in some circumstances it is contemplated that control means 60 may be supplied with a signal from an ammeter (not shown) representing a measured value of the current between the anode and cathode.

The present inventors have determined that operation of an EDI apparatus can be controlled in accordance with a ratio, referred to by the present inventors as an 'E-factor', or $E_f$, which is defined as $$E_f = \frac{\frac{I}{F}}{\left(\frac{Q}{n}\right) \sum_i \Delta c_i \times z_i}$$

where I is the current applied between the anode and cathode of EDI core 24, F is the Faraday constant used to convert coulombs into moles (i.e. 96,480 coulombs/mole), Q is the flow rate of the supply of fluid to be deionized to EDI core 24, n is the number of diluting compartments, $\Delta c_i$ is difference in the concentration of the ionic impurity i between the fluid to be deionized and the deionized fluid (i.e.—the 'concentration drop' through the apparatus for impurity i) and $z_i$ is the corresponding unit charge of the ionic impurity. For example, for an $Na^+$ or $Cl^-$ ion, the unit charge is one and for $SO_4^{2-}$, the unit charge will be two.

More specifically, depending upon the fluid to be purified, $\Sigma\Delta c_i \times z_i$ is calculated for anionic impurities and cationic impurities and the larger summation is selected for consideration in determining $E_f$. For example, if the fluid to be purified contains a relatively significant amount of dissolved $CO_2$, which will be ionized within EDI core 24 to $HCO_3^-$, $\Sigma\Delta c_i \times z_i$ will be larger for anionic impurities and this larger value will be selected for use in determining $E_f$.

It is contemplated that, in many cases, the ionic impurities in the water to be purified will not change greatly over time. Thus, a determination of the whether $\Sigma\Delta c_i \times z_i$ is larger for cationic or anionic impurities can be performed at some initial point in time, from an analysis of the water to be processed, and can be confirmed, if necessary, at selected intervals. In other cases, the determination of the greater of the anionic and cationic impurities will be performed on an ongoing basis.

$E_f$ is a dimensionless ratio and, in a preferred embodiment, Q is expressed in liters/sec, $\Delta c_i$ is expressed in moles/liter and I is expressed in amperes. It will be apparent to those of skill in the art that other expressions of measurement may also be employed.

It has been determined by the present inventors that an $E_f$ of at least 1 is required for acceptable operation of an EDI apparatus and, more preferably, that the $E_f$ be in the range of from about 1 to about 50 and more preferably, that the $E_f$ be in the range of from about 5 to about 20. More preferably, that the $E_f$ be in the range of from about 8 to about 15.

Accordingly, in operation of apparatus 20 control means 60 will, on an ongoing basis, determine the $E_f$ for apparatus 20 and output signal 76 will be appropriately set such that the current supplied by current supply means 44 is varied as necessary to maintain the determined $E_f$ within a predefined range for apparatus 20. For example, it may be desired that apparatus 20 be operated with $E_f$ in the range of 8 to 15 and the current supplied by current supply 44 will be increased or decreased accordingly by control means 60 to accommodate changes in the amount of ionic impurities present in flow 28 (as indicated by changes in the concentration measurements effected by device 48) or changes in the flow rate of supply 28 (as indicated by changes in signal 64 from device 52) or both or changes in other parameters which occur. It is also contemplated that control means 60 can provide an output to an operator or a process control system which is indicative of the actual determined $E_f$ that apparatus 20 is operating at and/or other operating parameters such as the concentration of ionic impurities in the deionized water supply 36 as measured by concentration measuring device 68. These outputs can be simple numerical values displayed to an operator, or any other suitable display technique as will occur to those of skill in the art, such as graphical display, etc.

The following example is included to illustrate further the present invention and is not intended as a representing a limitation of the present invention. As will be seen, this example indicates that the level of deionization of water through a particular test EDI apparatus decreased, from a maximum level, when the E-Factor, $E_f$, was below about 15. In this example, an EDI core such as those sold by the assignee of the present invention under the model designation E-Cell were employed.

In the test, the EDI apparatus included five diluting compartments and six concentrating compartments and was operated with a substantially constant flow rate of 0.131 liters/sec of water to be deionized through the diluting compartments. The water to be deionized was previously deionized to remove ionic impurities and a metering pump was used to inject NaCl into the water to be deionized, resulting in a test range conductivities between about 2.7 to about 50 μS/cm (with minimal ionizable species present) and the resistivity (the inverse of conductivity) of the deionized water was measured. The current flow between the anode and cathode was fixed at a current of 1.0 amps and the EDI apparatus was operated at different rates of NaCl injection (corresponding to different $E_f$'s) for approximately 20 minutes each.

Figure 2:
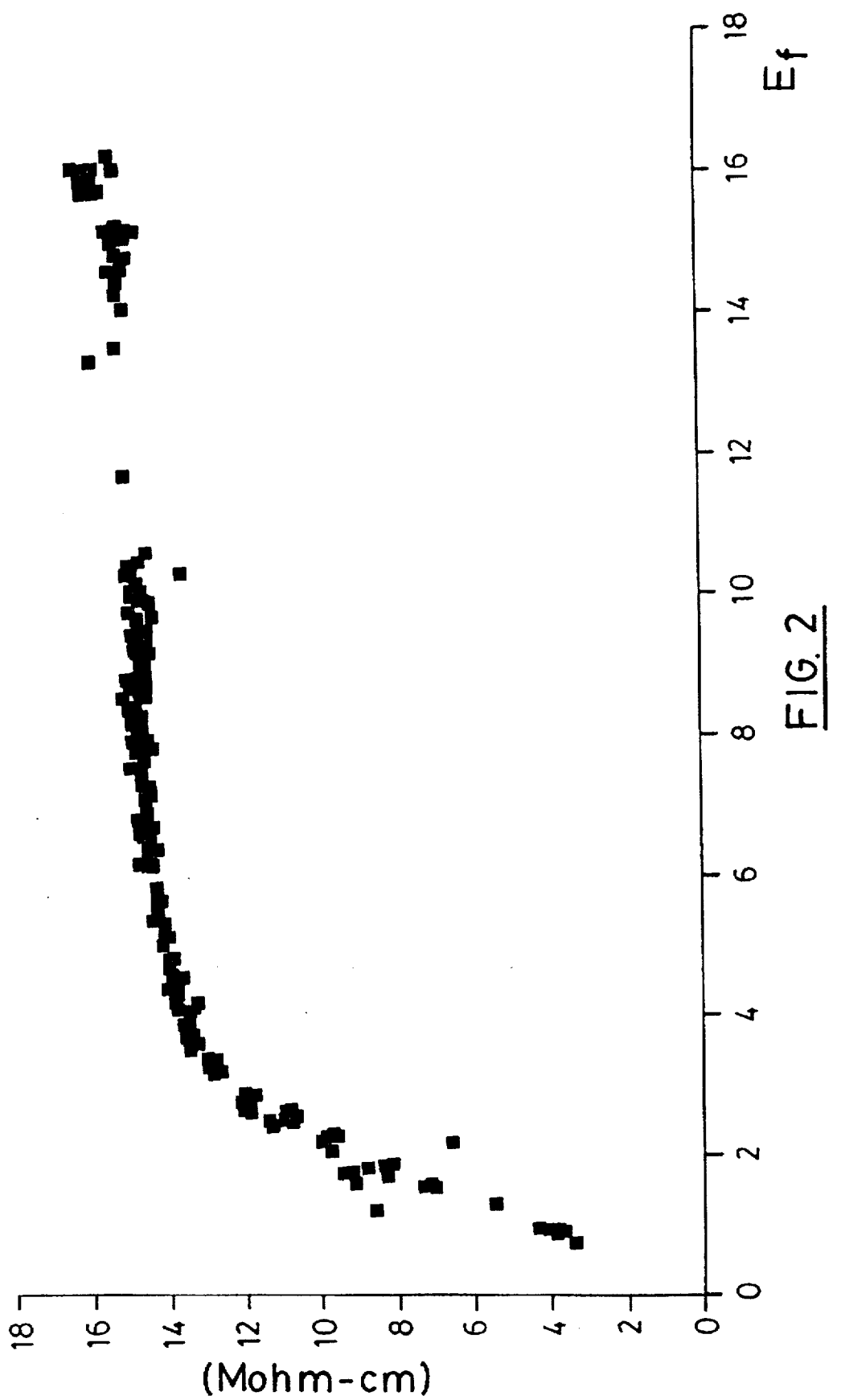
FIG. 2 shows a chart of operating results showing the relationship of resistivity to an E-Factor, as calculated in accordance with an embodiment of the present invention, for a test EDI apparatus.

A plot of the measured resistivity of the deionized water against the corresponding $E_f$ is shown in FIG. 2. As will be apparent from the plot, the level of ions remaining in the deionized water (as indicated by a drop in the resistivity of the water) rose sharply as $E_f$ fell below 6. The resistivity of the deionized water increased to 16.3 MΩ-cm (0.61 μS/cm) at $E_f$ equal to about 15.

In circumstances wherein concentration measuring device 48 and/or concentration measuring device 68 only directly measure the ions in the fluid and estimate the ionizable species which may be present, a higher $E_f$ can be employed than might otherwise be the case to ensure adequate removal of ionizable species. Accordingly, depending upon the concentration measuring devices and the use to which the deionized water will be put, acceptable results can be obtained over a wide range of $E_f$'s, such as from 1 to about 50, or more preferably, from about 5 to about 50, or more preferably from about 5 to about 20 and most preferably from about 8 to about 15.

As will be apparent, apparatus 20 can be operated with the current supplied by current supply means 44 being varied as necessary to maintain operation at a preselected $E_f$ or within a preselected range of $E_f$'s. In this manner, over specification of the current supplied by current supply means 44 is substantially avoided to achieve power efficiency in the operation of apparatus 20.

As will also be apparent to those of skill in the art, the present invention is not limited to controlling the operation of an EDI apparatus but can also be usefully employed during the manufacture and design of EDI apparatus. Specifically, given appropriate design criteria, an EDI apparatus can be reliably designed and manufactured without unnecessary over specification of the apparatus.

Figure 3:
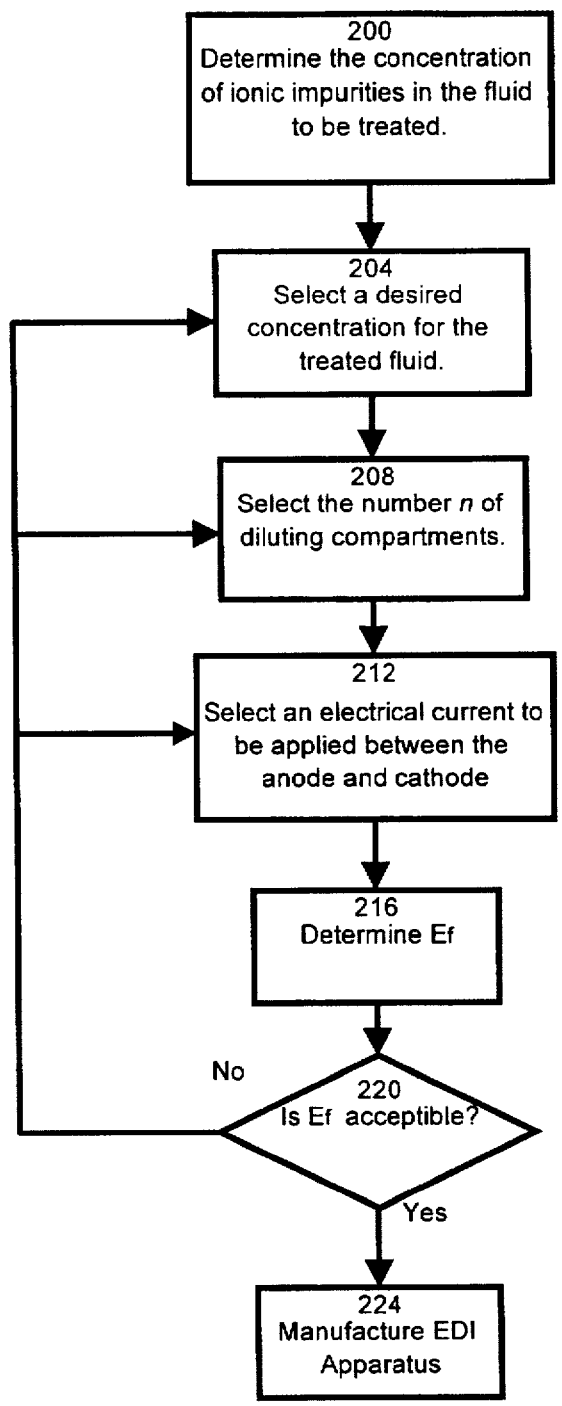
FIG. 3 shows a flowchart of a method of manufacturing an EDI apparatus in accordance with an embodiment of the present invention.

A flowchart representing one embodiment of a manufacturing method in accordance with the present invention is shown in FIG. 3. At step 200 a determination is made of the concentration of the ionic impurities of the fluid to be treated by the apparatus. Generally, there will be some expected variation in this determined value due to variations in the water supplied to be deionized and the manufacturing method will generally be performed with the determined value set at the largest, normally expected concentration value.

At step 204, a target concentration value for the processed fluid is selected, according to the intended use for the processed fluid. For example, it is generally desired that water which is deionized for use in semiconductor fabrication processes be deionized to a greater level (lower concentration) than water deionized for use in pharmaceutical manufacturing processes.

At step 208 the number of diluting compartments to be included in the apparatus is selected. Generally, the considerations here are twofold, namely the fewer diluting compartments of a given size included the EDI apparatus, the less expensive the apparatus is to manufacture and maintain but the higher the flow rate through the diluting compartments of the fluid to be treated, i.e. the residency time of the fluid to be treated in the compartment is reduced. It is contemplated that in many circumstances the selection of the number of diluting compartments to be included will determined almost entirely by the volume of fluid to be treated in a given time (liters per minute, etc.) and the other parameters discussed herein will be varied as necessary to achieve the desired range of $E_f$. Once the number (n) of diluting compartments is selected, the number of concentrating compartments is fixed at a number at least one greater ($\geq$n+1).

At step 212 an electrical current is selected as a target operating current to be supplied to the EDI apparatus.

At step 216 $E_f$ is determined, using the values determined and/or selected in steps 200 through 212. At step 220, if $E_f$ is within a preselected range of acceptable values, such as the above-mentioned range of 5 to 18, the method proceeds to step 224 wherein EDI apparatus in accordance with the selected and/or determined values is constructed.

If at step 220, it is determined that $E_f$ is not within the preselected range of acceptable values, the method revisits one or more of steps 204, 208 and 212. It is contemplated that, in many circumstances the target concentration of ionic impurities of the treated fluid is effectively prevented from being changed owing to the requirements of the intended use for the deionized fluid produced by the apparatus. Accordingly, it is contemplated that the two parameters most frequently available for modification will be the number of the diluting compartments and the current applied between the anode and the cathode. If the number of diluting compartments is varied, the number of concentrating compartments is changed accordingly.

Once one or more of the parameters of steps 204, 208 and 212 have been changed, steps 216 and 220 are repeated to determine if the resulting value of $E_f$ is within the preselected range of acceptable values. If $E_f$ is now acceptable, the method proceeds to step 224 wherein EDI apparatus in accordance with the selected and/or determined values is constructed.

If $E_f$ is still outside the preselected range of acceptable values, the method again revisits one or more of steps 204, 208 and 212. Generally, steps 204 through 220 are repeated in an iterative manner until $E_f$ is within the preselected acceptable range of values and the EDI apparatus can be manufactured at step 224.

In another embodiment of the method, the equation $$E_f = \frac{\frac{I}{F}}{\left(\frac{Q}{n}\right) \sum_i \Delta c_i \times z_i}$$

can be re-written as $$n = \frac{E_f F Q \sum_i \Delta c_i \times z_i}{I}$$

This equation can then be solved for n, the number of diluting compartments.

Acceptable values for n will vary in accordance with a variety of criteria, including the costs associated with constructing the EDI apparatus with more or fewer diluting compartments, the cost of the operating electrical current supplied to the EDI apparatus, etc.

Figure 4:
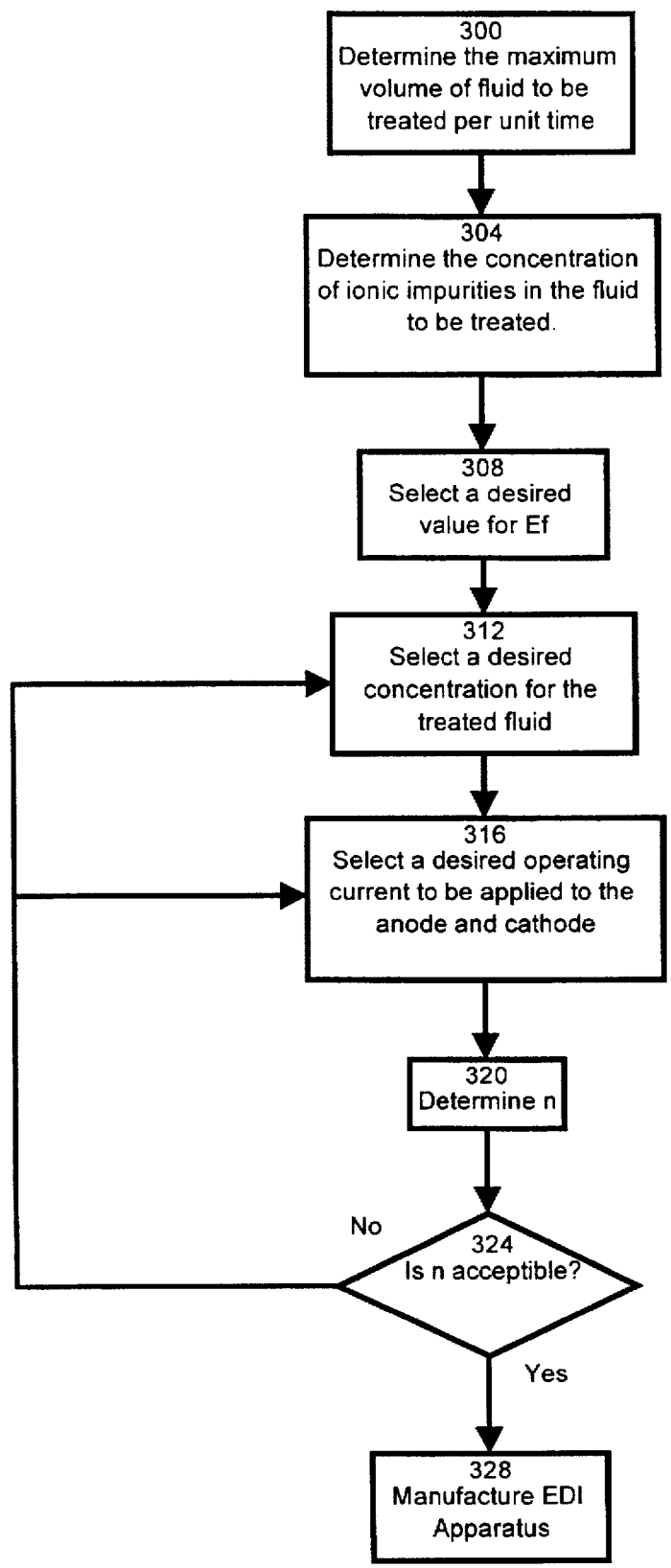
FIG. 4 shows a flow chart of a method of manufacturing an EDI apparatus in accordance with another embodiment of the present invention.

FIG. 4 shows a flowchart representing another embodiment of a method of manufacturing and EDI apparatus in accordance with the present invention wherein the number of diluting compartments 'n' is to be the focus consideration for the manufacture of the EDI apparatus. At step 300 the maximum volume of water to be treated per unit time (liters/sec) is determined. At step 304, the concentration of ionic impurities of the water to be treated is determined and at step 308 a desired value for $E_f$ is selected and at step 312 the desired concentration of ionic impurities for the treated fluid is selected and at step 316 a desired operating current is selected.

The equation given above is then solved for n at step 320 and the calculated value for n is then rounded up to the next integer value. A determination is made at step 324 as to whether the resulting value for n is acceptable. As mentioned above, the criteria as to whether a particular value of n is acceptable will vary in accordance with a variety of parameters, such as the cost of adding diluting chambers, the cost of supplying the electrical current, the physical size of the EDI apparatus etc., but the determination of acceptable values of n will be apparent to those of skill in the art.

If at step 324 the value of n is determined as being acceptable, the EDI apparatus is manufactured accordingly at step 328. If at step 324 the value of n is determined to be unacceptable, the method revisits one or both of steps 312 and 316 to select new values and steps 320 and 324 are performed again. If the value of n is again not acceptable at step 324, steps 312 through 324 are repeated in an iterative manner until n is acceptable and the EDI apparatus can be manufactured at step 328.

The above-described embodiments of the invention are intended to be examples of the present invention and alterations and modifications may be effected thereto, by those of skill in the art, without departing from the scope of the invention which is defined solely by the claims appended hereto.

We claim:

1. A method of manufacturing an EDI apparatus for the deionization of a first liquid supplied at or below a given maximum flow rate (Q), said apparatus comprising a cathode and an anode with a number of diluting compartments and concentrating compartments positioned between the cathode and the anode and arranged in an alternating manner, said apparatus including means for passing said first liquid through said diluting compartments at or below said given maximum flow rate and means for passing a second liquid through said concentrating compartments to receive ionic impurities from said first liquid when a electrical current is applied between said cathode and said anode, comprising the steps of:

determining the concentration of ionic impurities in the first liquid to be processed within said apparatus;

selecting a desired final concentration of ionic impurities for the first liquid after it has been processed within said apparatus;

selecting the number (n) of diluting compartments to be included in said apparatus, said selected number of diluting compartments being at least one;

selecting the number of concentrating compartments to be included in said apparatus, the selected number of concentrating compartments being at least one greater than said selected number of diluting compartments;

selecting an electrical current (I) to be applied between said anode and cathode, wherein the selection of said number of diluting compartments and the selected electrical current to be applied is such $E_f$ is greater than 1 in $$E_f = \frac{\frac{I}{F}}{\left(\frac{Q}{n}\right) \sum_i \Delta c_i \times z_i}$$

$$E_f = \frac{\frac{I}{F}}{\left(\frac{Q}{n}\right) \sum_i \Delta c_i \times z_i}$$

where F is the Faraday constant to convert coulombs to moles, $\Delta c_i$ is the difference in the concentration of impurity i in the first liquid to be processed and the selected final concentration of impurity i, $z_i$ is the charge of impurity i and $\Sigma \Delta c_i \times z_i$ is selected from the larger of the summation over the cationic impurities and the anionic impurities; and assembling said EDI apparatus with said selected number of diluting compartments.

2. The method of claim 1 wherein $E_f$ is in the range of from 1 to about 50.

3. The method of claim 1 wherein $E_f$ is in the range of from about 5 to about 50.

4. The method of claim 1 wherein $E_f$ is in the range of from about 5 to about 20.

5. The method of claim 1 wherein $E_f$ is in the range of from about 8 to about 15.

6. The method of claim 1 wherein the step of determining the concentration of ionic impurities comprises measuring the conductivity of the fluid to determine the concentration of ions and estimating the concentration of ionizable species.

7. The method of claim 1 wherein the step of determining the concentration of ionic impurities comprises measuring the conductivity of the fluid to determine the concentration of ions and employing a total organic content analyzer to determine the concentration of ionizable species.

8. A method of operating an EDI apparatus for the deionization of a first liquid, said apparatus comprising a cathode and an anode with alternating diluting and concentrating compartments positioned between the cathode and the anode, the number (n) of diluting compartments being at least one and the number of concentrating compartments being at least one greater than the number of diluting compartments, said apparatus including means for passing said first liquid through said number of diluting compartments at or below a given maximum flow rate (Q) and means for passing a second liquid through said number of concentrating compartments to receive ionic impurities from said first liquid when a electrical current (I) is applied between said cathode and said anode, comprising the steps of:

determining the difference between the concentration of ionic impurities of said first fluid prior to processing by said apparatus and a concentration of ionic impurities for said fluid after processing;

determining the flow rate (Q) of the first fluid through said at least one diluting compartment;

supplying electrical current (I) between said anode and said cathode such that $E_f$ is at least 1 in $$E_f = \frac{\frac{I}{F}}{\left(\frac{Q}{n}\right) \sum_i \Delta c_i \times z_i}$$

where F is the Faraday constant to convert coulombs into moles, $\Delta c_i$ is the difference in the concentration of impurity i in the first liquid to be processed and the selected final concentration of impurity i, $z_i$ is the charge of impurity i and $\Sigma \Delta c_i \times z_i$ is selected from the larger of the summation over the cationic impurities and the anionic impurities.

9. The method of claim 8 wherein $E_f$ is in the range of from 1 to about 50.

10. The method of claim 8 wherein $E_f$ is in the range of from about 5 to about 50.

11. The method of claim 8 wherein $E_f$ is in the range of from about 5 to about 20.

12. The method of claim 8 wherein $E_f$ is in the range of from about 8 to about 15.

13. The method of claim 8 wherein the difference of concentration of ionizable species in said difference ($\Delta c_i$) is estimated.

14. An apparatus for the electrodeionization of a fluid, comprising:

a cathode;

an anode;

an alternating series of at least one diluting compartment and a number of concentrating compartments at least one greater than the number of diluting compartments, each compartment defined between cation and anion permeable membranes and positioned between said cathode and said anode;

means to introduce said fluid to be deionized to said diluting compartments;

means to remove said fluid to be deionized from said diluting compartments after processing therein;

means to supply a waste fluid to said concentrating compartments and to remove said waste fluid therefrom;

electrical current supply means to supply an electrical current (I) to flow between said cathode and anode;

means to determine the difference in the concentration of ionic impurities in said fluid before deionization and after deionization within said at least one diluting compartment;

means to determine the flow rate (Q) of said fluid to be deionized through said diluting compartment;

control means responsive to each of said concentration difference and said determined flow rate to alter the supply of electrical current flowing between said anode and cathode such $E_f$ is greater than 1 in $$E_f = \frac{\frac{I}{F}}{\left(\frac{Q}{n}\right) \sum_i \Delta c_i \times z_i}$$

where F is the Faraday constant to convert coulombs into moles, $\Delta c_i$ is the difference in the concentration of impurity i in the first liquid to be processed and the selected final concentration of impurity i, $z_i$ is the charge of impurity i and $\Sigma \Delta c_i \times z_i$ is selected from the larger of the summation over the cationic impurities and the anionic impurities.

15. The apparatus of claim 14 wherein $E_f$ is in the range of from 1 to about 50.

16. The apparatus of claim 14 wherein $E_f$ is in the range of from about 5 to about 50.

17. The apparatus of claim 14 wherein $E_f$ is in the range of from about 5 to about 20.

18. The apparatus of claim 14 wherein $E_f$ is in the range of from about 8 to about 15.

19. The apparatus of claim 14 wherein said means to determine the difference ($\Delta c_i$) includes a total organic content analyzer or the like to determine the concentration of ionizable species.

* * * * *